Figure 1:
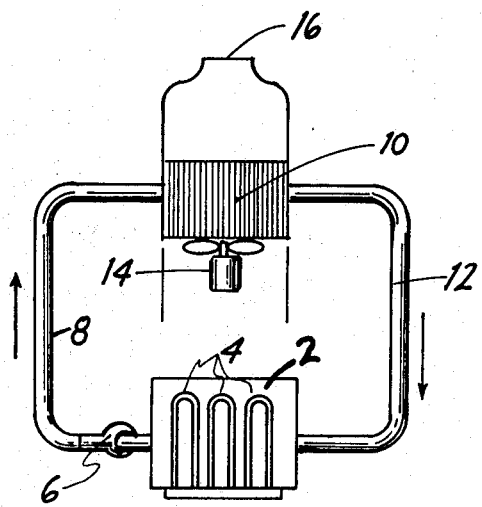

United States Patent
Cole

[15] 3,694,625
[45] Sept. 26, 1972

[54] CONTROL ARRANGEMENT FOR AN AIR HEATING APPARATUS
[72] Inventor: Saxon Cole, Webster Groves, Mo.
[73] Assignee: American Air Filter Company, Inc., Louisville, Ky.
[22] Filed: Feb. 2, 1971
[21] Appl. No.: 111,858

[52] U.S. Cl. ..................219/364, 219/358, 219/365, 219/370, 219/514, 236/70, 317/133.5
[51] Int. Cl.........H05b 1/02, H01b 47/26, F24h 3/06
[58] Field of Search......219/341, 364, 363, 365, 370, 219/369, 514, 519, 481, 371, 358; 317/133.5; 136/207; 236/69, 70, 1 E

[56] References Cited

UNITED STATES PATENTS

| | | | |
|---|---|---|---|
| 1,838,336 | 12/1931 | Vehling | 317/133.5 |
| 2,084,654 | 6/1937 | Ray | 317/133.5 X |
| 2,203,425 | 6/1940 | Welch | 219/364 |
| 2,240,812 | 5/1941 | Sparrow | 317/133.5 |
| 2,477,734 | 8/1949 | Gehrke | 219/365 X |
| 2,602,916 | 7/1952 | Anderson | 236/69 X |
| 3,277,275 | 10/1966 | Brusven | 219/365 |

Primary Examiner—A. Bartis
Attorney—Charles G. Lamb and Ralph B. Brick

[57] ABSTRACT

An improved control arrangement for an air heating apparatus having a multi-volt electrical power source, a power control circuit for energizing air blower means and air heating means, and a safety control circuit for de-energizing the power control circuit in response to an unsafe operating condition. The safety control circuit includes a thermoelectric generator which is activated by heat emitting means disposed within the power control circuit. The safety control circuit further includes a relay actuating winding in series with the thermoelectric generator, the relay actuating winding actuating a relay switch means. The improvement is in the relay switch means which includes a parallel combination of a normally closed switch and dropping resistor, the combination being in series with the heat emitting means so that when the relay switch means is actuated the heat emitting means is subjected to reduction in heat output.

4 Claims, 2 Drawing Figures

INVENTOR.
SAXON COLE
BY Charles G. Lamb
ATTORNEY

CONTROL ARRANGEMENT FOR AN AIR HEATING APPARATUS

BACKGROUND OF THE INVENTION

In the past few years there has been a considerable amount of research in the development of control arrangements for air heating apparatuses. Specifically, there has been research in the control arrangement of air heating apparatuses including air blower means and air heating means. One preferred control arrangement taught in the prior art includes a multi-volt electrical power source, a power control circuit for energizing air blower means and air heating means, and a safety control circuit for de-energizing the power control circuit in response to an unsafe operating condition. The safety control circuit includes a thermoelectric generator which is activated by heat emitting means disposed within the power control circuit. No means are disclosed for regulating the heat output of the heat emitting means so the thermoelectric generator is always subjected to the maximum heat output of the heat emitting means.

SUMMARY OF THE INVENTION

In the present invention, it is recognized that it is desirable to provide a control arrangement for an air heating apparatus to be used in potentially explosive atmospheres. Furthermore, it is recognized that it is desirable to include a safety control circuit in a control arrangement for an air heating apparatus wherein the safety control circuit is actuated by heat emitting means disposed within a power control circuit. Also, it is recognized that the heat emitting means heat output should be regulated during operation.

The present invention advantageously provides a straight forward control arrangement for an air heating apparatus including a multi-volt electrical source, a power control circuit, and a safety control circuit actuated by the power control circuit, but capable of de-energizing the power control circuit in response to an unsafe condition. The present invention further provides for heat emitting means in the power control circuit as the means for actuating the safety control circuit wherein as soon as the safety control circuit is actuated, means are provided for decreasing the heat output of the heat emitting means while the heat emitting means still develops sufficient heat to keep the safety control circuit actuated. The present invention also provides for a control arrangement which may be used in a potentially explosive atmosphere.

Various other features of the present invention will become obvious to those skilled in the art upon reading the disclosure set forth hereinafter.

More particularly, the present invention provides a control arrangement for an air heater having air blower means and air heating means and adapted to be used in potentially explosive atmospheres which comprises:

a. a multi-volt electrical power source;
b. a power control circuit connected to said source and operable when energized to cause energization of said air blower means and said air heating means, said power control circuit including relay switch means operable in one position to maintain energization of said power control circuit under normal operating conditions and in an opposite position to de-energize said power control circuit in response to an unsafe operating condition;
c. a safety control circuit operable when energized to actuate said relay switch means to said one position, and when de-energized to actuate said relay switch means to said opposite position, said generator responsive to a predetermined period of energization of said power control circuit through heat emitting means to produce a potential in the millivolt range, a relay winding controlling said relay switch means, and at least one normally closed switch operable to an open position in response to said unsafe operating condition to effect de-energization of said safety control circuit; and
d. heat emitting means being in series with a parallel combination of a normally closed switch operable to an open position in response to actuation of said relay switch means and a dropping resistor whereby during actuation of said relay switch means power input to said thermoelectric generator heater is reduced.

In accordance with a preferred embodiment of the invention, the control arrangement includes one circuit called a power control circuit, and another circuit which will be called a safety control circuit. The power control circuit, which has conventional line voltage applied thereto, controls the operation of relays or other means through which electrical power is delivered to the air blower and air heating means of the apparatus. The safety control circuit is powered by a thermoelectric generator subject to energization of the power control circuit, and which puts out an E.M.F. in the millivolt range. The safety control circuit includes a number of normally closed switches operable to an open position in response to an unsafe operating condition, and also includes a series connected relay winding which, when energized, actuates relay switch means to maintain energization of the power control circuit. If any of the normally closed switches in the safety control circuit open in response to sensed unsafe operating conditions, the consequent de-energization of the relay winding results in the relay switches operating to positions wherein a shutdown of the heater apparatus occurs.

Preferably a time delay arrangement is provided in the power control circuit to give the thermoelectric generator an opportunity to energize the safety control circuit and shift the energization of the power control circuit to an alternate circuit before the time delay arrangement drops out and de-energizes the line through which a portion of the power control circuit is initially energized. It is further preferable that both the blower means, and the heat emitting means to which the thermoelectric generator is subjected, be energized at about the same time and prior to energization of the air heating means of the heater apparatus so that there is an initial purging period using unheated air. Also, there is provided means for reducing the power input into the heat emitting means once the heat emitting means reaches a selected condition.

Figure 2:
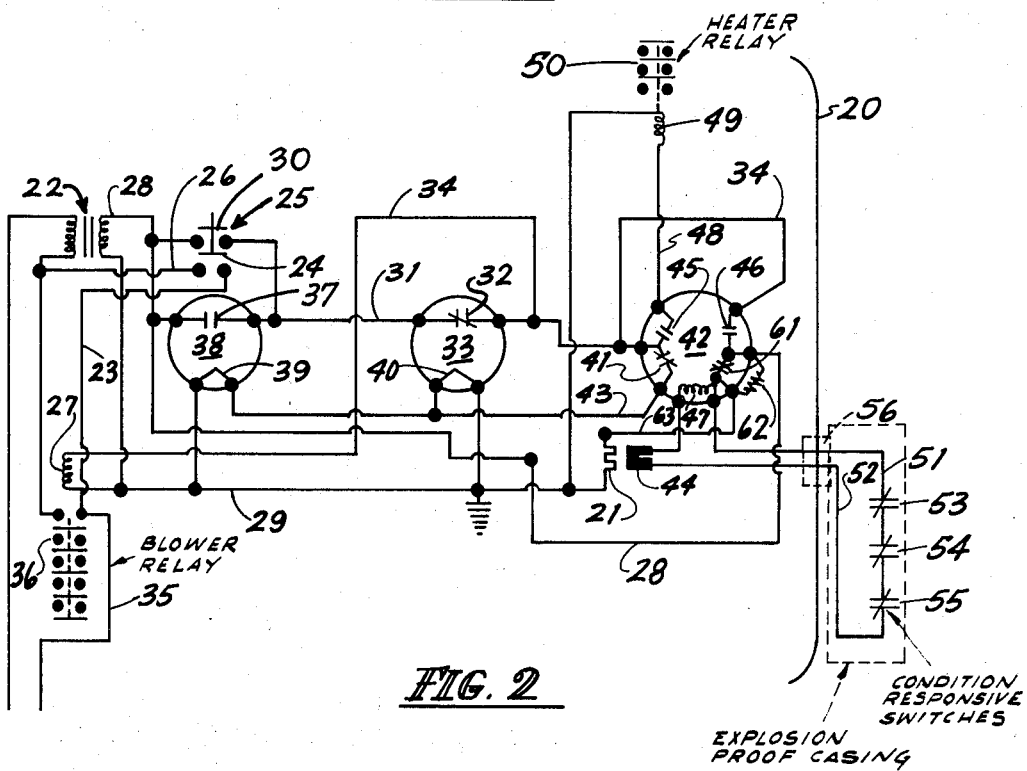

The relationship of the power control circuit to the safety control circuit is such that a substantial portion of the safety control circuit need not be encased and sealed within explosion proof structure. Thus, the placing of the unsafe condition sensing means at any desired location on or in the heater apparatus is facilitated, and a considerable savings is effected thereby. The invention will be described in connection with the accompanying drawing illustrating an embodiment thereof by way of example, and wherein:

FIG. 1 is a largely diagrammatic representation of one kind of air heating apparatus to which the invention may be applied; and, FIG. 2 is a schematic representation of a control circuit arrangement embodying the invention.

It is believed that the invention will be more readily understood if it is explained as applied to one type of air heater adapted for use in hazardous atmospheres. Thus, the FIG. 1 representation of an air heater is provided for showing certain basic elements included in such a heater.

In FIG. 1, a liquid heating tank 2 containing a series of electrical heating elements 4 is provided to heat liquid which is pumped through a continuous circuit including the liquid pump 6, liquid line 8, heat exchanger or coil 10 and liquid line 12 back to the tank 2. Air is forced through the coil by an electrically powered blower assembly 14 and the heated air is conducted from the outlet 16 on the opposite side of the heat exchanger through ducts (not shown) to the area to be served.

The power control circuit and safety control circuit for controlling operation of certain parts of the FIG. 1 apparatus are shown in FIG. 2. All of the circuitry required for operating heater apparatus of the nature illustrated in FIG. 1 is not included in FIG. 2, FIG. 2 illustrating those parts of the circuitry herein characterized as the power control circuit and the safety control circuit. The power control circuit is so characterized because it controls the operation of the switches through which the power for electrical heating elements 4 and the blower means 14 of FIG. 1 is delivered. The safety control circuit is so characterized because under unsafe operating conditions it will cause the power control circuit to shut down the heater.

All of the power control circuit is on the left side of the heavy vertical line designated 20 and is encased in explosion proof structure as illustrated by the broken-line box. A part of the safety control circuit (i.e., that part of the circuit directly associated with the power control circuit), is also on the left side of the heavy line 20, while that part of the safety control circuit including the unsafe condition sensitive switches is on the right side of the heavy line 20.

Under normal starting conditions, the power control circuit serves to cause energization in sequence of the blower means 14 and then the electric heating elements 4. The manner in which this is accomplished by the circuits of FIG. 2 will not be described.

Alternating current line power is initially delivered to the primary winding of control transformer 22 through line 23, one set of contacts 24 of the momentary contact start switch 25, and line 26. With the secondary of the transformer 22 energized and start switch 25 momentarily closed, both the thermoelectric generator heater element 21 and the blower relay switch winding 27 will be energized; the former through a completed circuit including the transformer secondary line 28, normally closed switch 61, the heater 21, and line 29 back to the secondary; and the latter through the completed circuit including the secondary line 28, upper contacts 30 of the start switch 25, line 31, normally closed switch 32 in time delay relay 33, line 34, the winding 27, and line 29 back to the secondary.

The blower relay switch means 35, controlled by winding 27, includes one set of contacts 36 in parallel with the contacts 24 of the start switch 25 so that after the switch means 35 closes due to energization of the winding 27, opening of start switch 25 does not result in de-energization of the control transformer 22. The other set of contacts 30 of start switch 25 is in parallel with the normally open switch 37 of the other time delay relay 38, which operates to a closed position in a relatively short period (say 2 seconds) after energization of its filament 39, so that energization of the relay winding 27 will continue through the previously recited circuit after start switch 25 is released.

The time delay relay 33 has a period of somewhat longer time (say three minutes) after energization of its filament 40 before its normally closed switch 32 opens. The time delay relays 33 and 38 are simultaneously energized from the transformer secondary when start switch 25 is closed through the following circuit: the start switch contacts 30, line 31, relay switch 32, the branch of line 34 connected to normally closed switch 41 of limit control relay 42, and line 43 connected to each of the filaments 39 and 40. The delay period of the time delay relay 33 permits the thermoelectric generator heater 21 to emit sufficient heat that thermoelectric generator 44 associated therewith generates power of the order required to make the safety control circuit functional before the switch 32 opens after the three minutes. During the portion of this period after energization of the blower relay winding 27 and before energization of the safety control circuit, the blower means 14 will be energized without the electrical air heating elements 4 being energized so that there is a period of purging unheated air flow.

Now, briefly considering the operation of the circuit thus far described, when the start switch 25 is closed, a starting circuit is completed causing energization of the blower relay winding 27, heater 21 for the thermoelectric generator 44, and the filaments 39 and 40 of the two time delay relays. After two seconds the switch 37 in the time delay relay 38 closes so that the start switch can be released. This starting condition is maintained until the normally closed switch 32 of time delay relay 33 opens after three minutes of energization of its respective filament 40, or until the limit control relay 42 is actuated by energization of the safety control circuit during the three minute period. The latter alternative, which is the normal situation, results in the establishment of both an alternate energizing connection to the blower relay winding 27, and the energization of the air heating means, through the limit control relay 42, and this aspect of the invention will now be explained.

The limit control relay designated 42 includes switches 45 and 46 in addition to switches 41 and 61. The limit control relay 42 also includes a relay actuating winding 47 which forms a part of the safety control circuit in series with the thermoelectric generator 44. Dropping resistor 62 is further included in parallel with normally closed switch 61. When the winding 47 is not carrying sufficient current to cause the relay 42 to be actuated, switches 41 and 61 are closed and switches 45 and 46 are open. When the winding is carrying sufficient current to actuate the relay, switches 41 and 61 open and switches 45 and 46 close.

The switch 45 has one side connected by line 48 to relay winding 49 which actuates the relay switches 50 to a closed position for energizing the electrical heating elements 4 (of FIG. 1). The other side of the switch 45 is connected to a branch of line 34.

The switch 46 has one side connected to a branch of line 34 and its other side is connected to a branch of line 28 which is directly connected to one side of the control transformer 22 secondary. The switch 61 and the dropping resistor 62 are connected in parallel with one side of the parallel connection being to a branch of line 28 also, and the other side is connected to the line 63 which is directly connected to one side of the thermoelectric generator heater 21. When the winding 47 is carrying sufficient current to cause the relay 42 to be actuated, switch 46 closes and the blower relay winding 27 will remain energized from the control transformer secondary through a circuit including: line 28, switch 46, and line 34 to the winding 27. If switch 46 does not close before switch 32 of the time delay relay 33 opens, then the winding 27 will be de-energized by opening of the switch 32. Also, when relay 42 is actuated and switch 61 opens, the thermoelectric generator heater 21 will remain energized, but under a lower voltage, from the control transformer secondary through a circuit including: line 28, dropping resistor 62 and line 63 to the thermoelectric generator heater 21. In this arrangement, heater 21 comes on at full power until the relay 42 is actuated then the switch 61 opens leaving the dropping resistor 62 in series with the heater 21. The dropping resistor 62 lowers the power input to the heater 21 thereby reducing the heat emission from the heater 21. It has been found, as pointed out above, that the highest temperature is needed only long enough to emit sufficient heat for the thermoelectric generator 44 associated therewith to make the safety control circuit functional.

The safety control circuit, including limit control relay winding 47 connected in series with the thermoelectric generator 44, also includes lines 51 and 52 and a number of series connected condition responsive switches designated 53, 54 and 55. Each of these switches is normally closed and operates to an open position in response to a sensed unsafe condition.

It will be appreciated that if any of the switches 53–55 are open, there will be no current flow in the safety control circuit or through winding 47 therein, and consequently the limit control relay 42 will revert to a position wherein switches 45 and 46 are open and switches 41 and 61 are closed. Switch 45 opening will de-energize the relay winding 49 for the electrical heating element 4. Switch 46 opening will de-energize the blower relay winding 27 if either of the time delay relay switches 32 or 37 is open. When the blower relay switch means 35 opens, the one set of contacts 36 which completes the circuit to the primary of the control transformer will also be opened so that the transformer will be de-energized and the heater 21, which is connected to the transformer secondary, will be de-energized. Thus, before the power control circuit can again be energized to place the air heater back into operation, it is required that the start switch 25 be manually closed to again energize the control transformer 22 for the completion of circuits previously outlined.

The power control circuit is energized with a potential in the multivolt range from the control transformer 22 which has conventional alternating current voltage in the range of say 110 to 120 volts applied to the primary. In contrast thereto the safety control circuit, which derives its electromotive force from the thermoelectric generator 44, operates with direct current in a millivolt range. Consequently the connecting wiring 51 and 52 need not be encased or sealed within rigid conduit, and the switches 53–55 may be disposed at whatever locations are desirable without regard to the difficulty of making connections to them with explosion proof rigid conduit.

As applied to a heater of the character shown in FIG. 1, one of the switches 53–55 may be a hermetically sealed high temperature limit switch submerged in the circulating liquid system, another may be a high temperature limit switch disposed in the outlet air stream at 16, and the other may be considered as being representative of a series of high temperature limit switches selectively disposed on certain surfaces of the heater apparatus subject to overheating, such as the liquid pump 6, heat exchanger 10, tank 2, etc. The advantages inherent in not requiring that such elements and the connecting wires thereto be encased in sealed rigid conduit will thus be readily appreciated.

At the point indicated 56 where the wires 51 and 52 pass into the encasing structure of the power control circuit, an explosion proof connector is provided. All of the elements and wiring to the left of the heavy line 20 is of course enclosed in explosion proof housing or conduit. It is also noted that since the safety control circuit is not directly connected electrically to any alternating current wiring, that there is no problem of the generation in the safety control circuit of spurious signals which might disturb radios or other electronic equipment.

In the operation of the safety control circuit there is a built in feature for protecting the thermoelectric generator heater 21 from overheating. This is accomplished by thermoelectric generator 44 being responsive to the heat developed by the thermoelectric generator heater 21 wherein the amount of heat developed by heater 21 is subject to the operation of the limit control relay 42. As illustrated, when the relay 42 is actuated normally closed switch 61 opens and the circuit to heater 21 is completed through dropping resistor 62. Dropping resistor 62 reduces the power input into the heater 21 thereby causing a reduction in the heat from heater 21 and since the relay 42 is operable as soon as relay actuating winding 47 is energized by the power generated by the thermoelectric generator 44, then as long as the thermoelectric generator 44 is developing enough power to actuate winding 47 the heater 21 will be operating at a lower voltage than needed to initially heat the thermoelectric generator 44.

The invention claimed is:

1. In a control arrangement for an air heater having air blower means and air heating means and adapted to be used in potentially explosive atmospheres; the improvement comprising, a. a multi-volt electrical power source;

b. a power control circuit connected to said source and operable when energized to cause energization of said air blower means and said air heating means, said power control circuit including relay switch means operable in one position to maintain energization of said power control circuit under normal operating conditions and in an opposite position to de-energize said power control circuit in response to an unsafe operating condition;

c. a safety control circuit operable when energized to actuate said relay switch means to said one position, and when de-energized to actuate said relay switch means to said opposite position, said safety control circuit including, in series, a thermoelectric generator responsive to a predetermined period of energization of said power control circuit through an electrical heat emitting means associated with said generator and connected in said safety circuit to produce a potential in the millivolt range, a relay winding controlling said relay switch means, and at least one normally closed switch operable to an open position in response to said unsafe operating condition to effect de-energization of said safety control circuit; and, d. said heat emitting means being in series with a parallel combination of a normally closed switch operable to an open position in response to actuation of said relay switch means to said one position and a dropping resistor whereby during actuation of said relay switch means to said one position power input to said heat emitting means is reduced to a level below that of the maximum heat output of said heat emitting means but above the minimum heat output necessary to keep the safety circuit energized.

2. The control arrangement of claim 1 wherein said power control circuit includes time delay means through which at least a part of said power control circuit is initially maintained energized until said safety control circuit is energized to actuate said relay switch means to said one position, said time delay means including normally closed switch means operable to an open position to de-energize the energized part of said power control circuit if, during said closed period of said normally closed switch means, said safety control circuit has failed to be energized.

3. The control arrangement of claim 2 wherein said relay switch means in said opposite position includes a first normally closed switch connected to control actuation of said time delay means, a second normally open switch connected, when closed, to energize said air heating means, and a third normally open switch connected, when closed, to provide an alternate path for energization of said air blower means.

4. The control arrangement of claim 3 wherein said heat emitting means is a thermoelectric generator heater.

* * * * *